United States Patent
Braidt et al.

(10) Patent No.: US 9,566,623 B2
(45) Date of Patent: Feb. 14, 2017

(54) LOW MAINTENANCE NOZZLE MIXER UNIT FOR ROLL NIP LUBRICATION

(71) Applicant: PRIMETALS TECHNOLOGIES AUSTRIA GMBH, Linz (AT)

(72) Inventors: Thomas Braidt, Linz (AT); Reinhard Karl, Leonding (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 0 days.

(21) Appl. No.: 14/377,421

(22) PCT Filed: Feb. 7, 2013

(86) PCT No.: PCT/EP2013/052370
§ 371 (c)(1),
(2) Date: Aug. 7, 2014

(87) PCT Pub. No.: WO2013/120750
PCT Pub. Date: Aug. 22, 2013

(65) Prior Publication Data
US 2015/0007628 A1    Jan. 8, 2015

(30) Foreign Application Priority Data
Feb. 15, 2012  (EP) .................................... 12155484

(51) Int. Cl.
*B21B 27/10*    (2006.01)
*B21B 45/02*    (2006.01)
*B01D 35/02*    (2006.01)

(52) U.S. Cl.
CPC ............... *B21B 27/10* (2013.01); *B01D 35/02* (2013.01); *B21B 45/0242* (2013.01); *B21B 45/0248* (2013.01); *B21B 45/0251* (2013.01)

(58) Field of Classification Search
CPC .......... B21B 27/06; B21B 27/10; B21B 37/32; B21B 45/02; B21B 45/0242; B21B 45/0248; B21B 45/0251
See application file for complete search history.

(56) References Cited

U.S. PATENT DOCUMENTS 3,709,012 A * 1/1973 Larsonneor ............. B21B 27/10
                                                          72/12.5
5,090,225 A * 2/1992 Schimion ......................... 72/45
(Continued)

FOREIGN PATENT DOCUMENTS

CN    101342545 A    1/2009
CN    101547755 A    9/2009
(Continued)

OTHER PUBLICATIONS

International Search Report dated May 13, 2013 issued in corresponding International patent application No. PCT/EP2013/052370.
(Continued)

*Primary Examiner* — Teresa M Ekiert
(74) *Attorney, Agent, or Firm* — Ostrolenk Faber LLP

(57) ABSTRACT

A device for lubricating the cylinders of a roll stand, in particular for roll nip lubrication in a roll stand for strip-shaped rolling stock. A mixture of water and oil is produced by a mixing and spraying device (1). The mixture is sprayed onto at least one of the cylinders (2) of the roll stand and/or to the surface of the rolling stock (3). The mixing and spraying device (1) include an arrangement of several nozzle mixer units (4). Water is guided thereto by a first supply line (5) and oil is guided thereto by a second supply line (6).

13 Claims, 3 Drawing Sheets

(56) References Cited

U.S. PATENT DOCUMENTS

| | | | |
|---|---|---|---|
| 5,524,465 A * | 6/1996 | Kajiwara | B21B 13/023 |
| | | | 72/201 |
| 6,598,448 B1 | 7/2003 | Barten et al. | 72/201 |
| 8,297,099 B2 | 10/2012 | Seidel | |
| 2011/0094829 A1 | 4/2011 | Seidel | 184/6.4 |
| 2014/0060135 A1 | 3/2014 | Pawelski et al. | |

FOREIGN PATENT DOCUMENTS

| | | |
|---|---|---|
| DE | 10 2007 042 898 A1 | 12/2008 |
| DE | 10 2008 050 392 A1 | 12/2009 |
| EP | 1 142 653 A2 | 10/2001 |
| EP | 1 399 276 B1 | 2/2005 |
| JP | 11-285712 | 10/1999 |
| JP | 2011-000640 | 1/2011 |

OTHER PUBLICATIONS

Chinese Office Action issued Apr. 3, 2015 in corresponding Chinese Patent Application No. 201380009676.0, along with English translation of relevant portions thereof.

\* cited by examiner

LOW MAINTENANCE NOZZLE MIXER UNIT FOR ROLL NIP LUBRICATION

CROSS-REFERENCE TO RELATED APPLICATIONS

The present application is a 35 U.S.C. §§371 national phase conversion of PCT/EP2013/052370, filed Feb. 7, 2013, which claims priority of European Patent Application No. 12155484.4, filed Feb. 15, 2012, the contents of which are incorporated by reference herein. The PCT International Application was published in the German language.

TECHNICAL FIELD

The invention relates to a device for lubricating the cylinders of a roll stand, especially for roll nip lubrication in a roll stand for strip-shaped rolling stock, wherein a mixture made out of water and oil is produced by means of a mixing and spraying device and this mixture is sprayed onto at least one of the cylinders of the roll stand and/or onto the surface of the rolling stock.

PRIOR ART

It is known that, during the manufacturing of a metal strip, its surface quality can be improved when the coefficient of friction between working cylinders and rolling stock is reduced. When a lubricant is introduced, during the manufacturing of the metal strip for example, not only is the energy expended for the rolling process lowered, but the lifetime of the working cylinders of a roll stand is also increased.

Usually an emulsion made of oil and water is used for roll nip lubrication. The emulsion is created in a mixing device. For this purpose oil and water are supplied via a supply line to the mixing device. From the mixing device the emulsion arrives via pipe lines at an arrangement of spray nozzles which are placed along the roll nip on the upper side and on the lower side of the metal strip. Fan spray nozzles are used for example as spray nozzles, by means of which the mixture of water and oil is sprayed onto the working cylinders of the roll stand and/or onto the surface of the metal strip.

With known devices for roll nip lubrication the mixing of oil and water is undertaken in a single centrally-disposed mixing device. This mixing device is assigned a plurality of spray nozzles. The connection to the spray nozzles is made via pipe lines. The length of these pipe lines can amount to several meters.

Document EP 1 399 276 B1 describes such a roll nip lubrication system in which a central mixer is assigned spray nozzles disposed in spray zones. The individual nozzles of a spray zone are activated via switching valves, so that different widths of rolled strips can be processed in the rolling train.

The central creation and the subsequent distribution of the emulsion to a number of spray nozzles has the disadvantage that, despite high and thus cleansing flow speeds in the pipe lines, blockages build up between the mixer and the nozzle, and mixture separation can occur. The longer are the pipe lines, the longer the emulsion remains in the pipes and thus the degree of deposits forming on the inner surface of the pipe line may increase. Over the course of time, the pipe lines become blocked, and the effect of the roll nip lubrication becomes less. It can occur that particles break away from the saponification and block the exit opening of a spray nozzle. Then the roll nip lubrication fails entirely in this nozzle section, so that the surface quality of the rolled strip can be considerably adversely affected.

In order to prevent an inadequate lubrication effect, a roll nip lubrication system must be subject to maintenance at regular intervals. During that maintenance, assemblies for which lack of contamination is critical, such as mixer, spray nozzles and connecting pipe lines, are cleaned. In document EP 2 040 860 B1 it is proposed for the purposes of cleaning to supply the mixer unit not only with water and oil but also with a cleaning medium such as hot water or water vapor. In addition to the supply lines for water and oil, hot water is directed in a third supply line to the location of the contamination. The hot water is kept in a container.

The maintenance for a roll nip lubrication system which is actually undertaken when the roll stands are at a standstill is essentially dictated by the scope of the required cleaning measures for removing the contamination and saponification.

SUMMARY OF THE INVENTION

The object of the present invention is to specify a device for lubricating the cylinders of a roll stand in which the maintenance effort is as low as possible.

This object is achieved by a device with the features disclosed herein.

According to the basic idea of the invention, each mixer and nozzle are combined into one constructional unit, meaning that each spray nozzle is assigned a mixer unit. The emulsion is thus not created centrally and then distributed to a number of spray nozzles, but is created locally for each spray nozzle. This means that it is possible to produce the emulsion where it is also sprayed. This does away with long pipe lines between mixer and nozzle which, as a result of the long dwell time, are especially critical for contamination. Since the saponification forms less heavily in the roll nip lubrication system, cleaning has to be done less frequently. This means that overall the maintenance effort is lower.

In order to keep connection paths between the creation and the spraying of the emulsion as short as possible, it is advantageous for mixer and nozzle, viewed in the direction of flow, to be as close as possible to each other, and at best disposed immediately adjacent to one another.

It is especially useful for mixer and spray nozzle to be integrated into one component. Thus there is no connecting line at all. The time the emulsion spends in the mixing and spray device is extremely short. A short dwell time means that the saponification is very small.

An especially preferred embodiment is characterized by the mixing device being formed from a pre-mixing chamber and a main mixing chamber.

To avoid saponification residue it can be useful for the supply line of the oil to the mixing device to be routed via a stop valve provided in the nozzle mixer unit. This prevents water penetrating into the oil line during a cleaning interval in which the oil supply is actually interrupted and forming saponification there.

It is useful here if the channel of the oil supply line has the smallest possible diameter, e.g. less than 3 mm. This means that the surface to which saponification can adhere is small. At the end of the cleaning interval, when the flow of oil is enabled again, the high flow speed in an oil channel promotes a "blowing out" of any deposits.

To further reduce the maintenance effort, it can be advantageous for a quick exchange device to be provided for each nozzle mixer unit. Such a quick exchange device can for example be realized so that the fitting of a nozzle mixer unit in a retaining device is made by means of a latching or snap-in connection, e.g. a bayonet lock. This enables the nozzle mixer unit to be changed manually very quickly during a maintenance shutdown. The removed nozzle mixer unit can be cleaned "off-line", and maintenance carried out if required.

BRIEF DESCRIPTION OF THE DRAWINGS

For further explanation of the invention reference is made in the subsequent part of the description to drawings, from which further advantageous embodiments, details and developments of the invention are to be taken, based on a non-restrictive exemplary embodiment. In the figures.

DESCRIPTION OF AN EMBODIMENT

Figure 1:
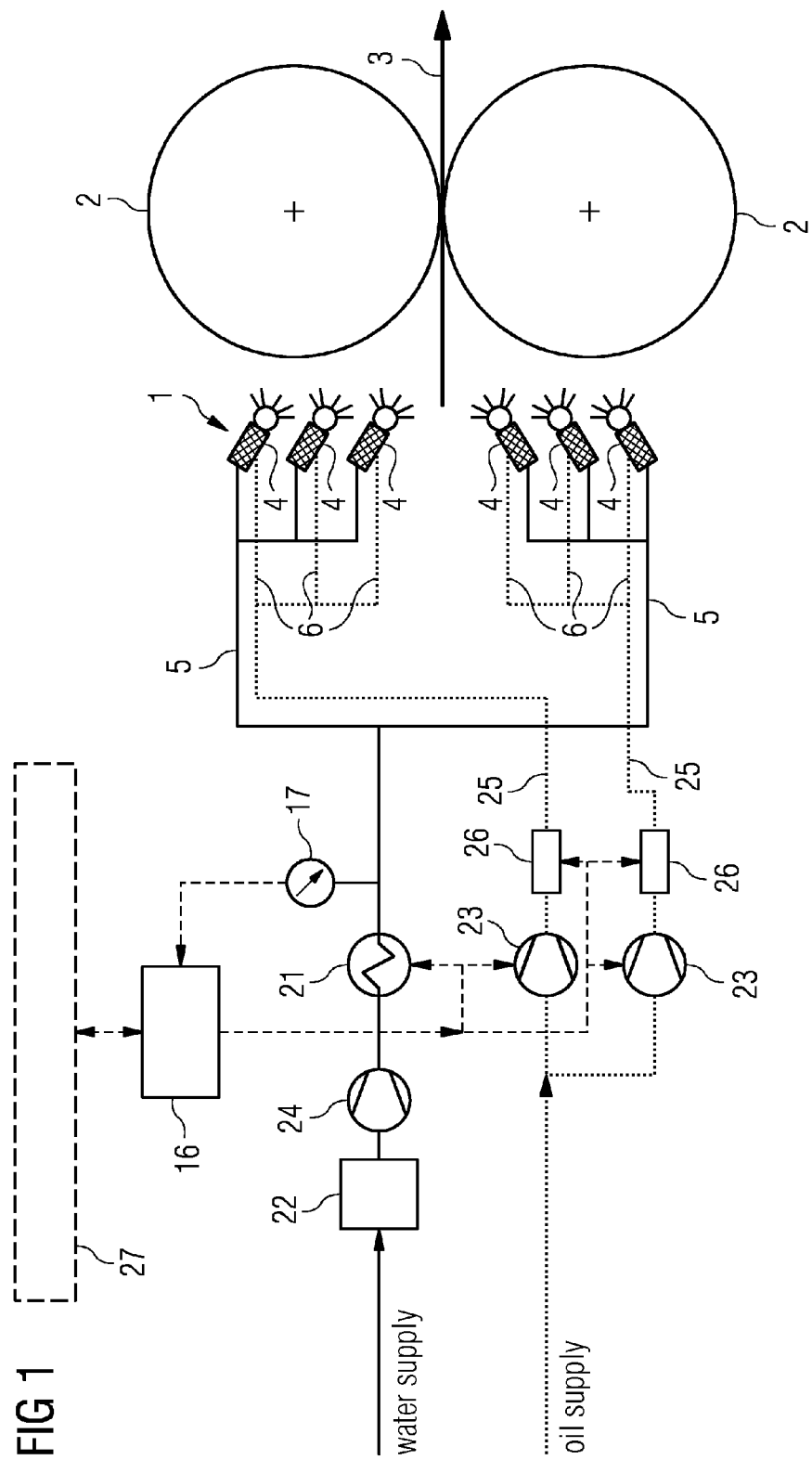
FIG. 1 shows a block diagram of an inventively embodied roll nip lubrication device, in which the mixing and spray device is formed from an arrangement of nozzle mixer units.

FIG. 1 shows a block diagram of an inventively embodied roll nip lubrication unit. A mixing and spray device 1 is formed from a number of nozzle mixer units 4. These nozzle mixer units 4 introduce an emulsion, made up of water and oil, into the roll nip. This is done by the nozzles 8 (see FIG. 2) of the nozzle mixer unit 4 spraying the emulsion onto the working cylinders 2 and/or onto the surface of the rolled strip 3.

Each nozzle mixer unit 4 is supplied with water via a first supply line 5 and with oil via a second supply line 6. The nozzle and mixer form one constructional unit.

The oil supply line to the mixing and spray devices 1 is routed in line bundles 25. The oil lines are supplied either by individual pump elements and/or via oil valves which operate in switched mode or continuously. Thus each nozzle mixer unit can have a common or individual oil flow applied to it, e.g. also 0%.

As can easily be seen from the diagram of FIG. 1, the oil and water are not mixed in a central unit but are mixed practically at the location where the emulsion is introduced by spraying into the roll nip.

A control unit 16, which exchanges data with the rolling process controller 27, controls the dosing pumps 23 here in the oil supply and also the water pump 24.

Figure 2:
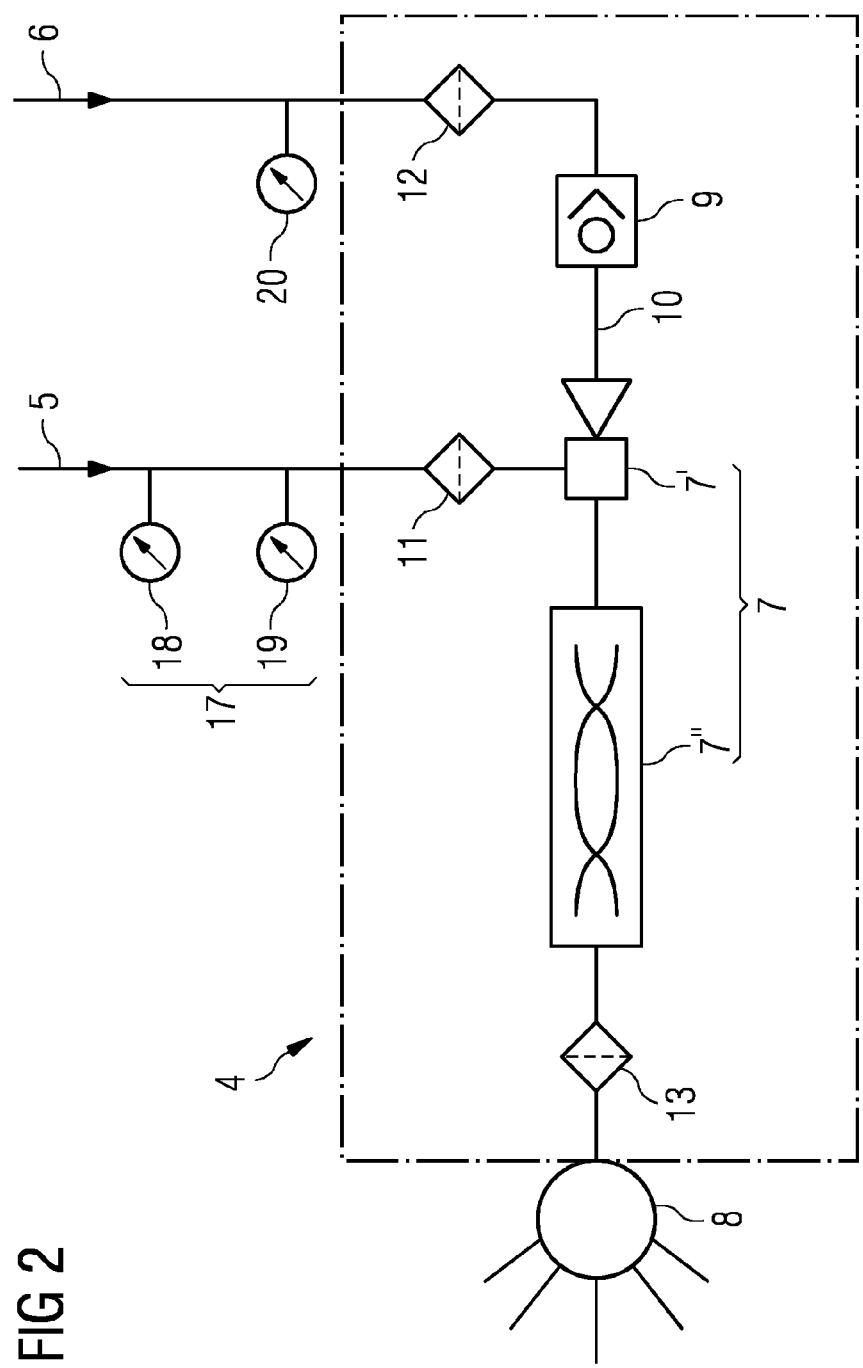
FIG. 2 shows a block diagram of a nozzle mixer unit.

For the purposes of cleaning the nozzle mixer units 4 a continuous flow heater 21 is disposed in the water supply circuit. This heating device 21 enables the water flowing via the first supply line 5 to the nozzle mixer units 4 to be heated. Connecting lines and nozzles can be cleaned and blown out by the hot water. In this case, the control unit 16 specifies the cleaning interval. In order to detect the degree of contamination in the water supply line 5, a sensor device 17, comprised of a pressure sensor 18 and a temperature sensor 19 in FIG. 2 is provided. The measurement signal of the sensor device 17 is conveyed to the control unit 16. The control unit 16 uses this measurement information to define the time and duration of a cleaning interval.

The nozzle mixer unit 4 is shown in more detail in FIG. 2 in a block diagram. It comprises a mixing device 7, in which water and oil are mixed to an emulsion, and a nozzle 8, by means of which the mixture of oil and water can be sprayed onto the working cylinders 2 or into the roll nip respectively. To keep contamination particles and released deposits of the saponification away from the outlet opening of the nozzle 8, if possible, a number of filters are provided: in the water supply line the filter 11, in the oil supply line the filter 12 and the filter 13, which filters the emulsion flowing to the nozzle 8. As shown in the diagram of FIG. 2 the mixing device 7 can comprise a premixing chamber 7' and the main mixing chamber 7".

In a cleaning phase the supply of oil is interrupted and hot water at a temperature of more than 60° C. flows through the water supply line 5. In order to prevent this hot water from being pushed into the line of the oil supply, the stop valve 9 is provided. The connecting line 10 between the stop valve and premixing chamber 7' is designed with a flow cross-section of less than 3 mm². This enables a saponification to be largely prevented in this section.

Figure 3:
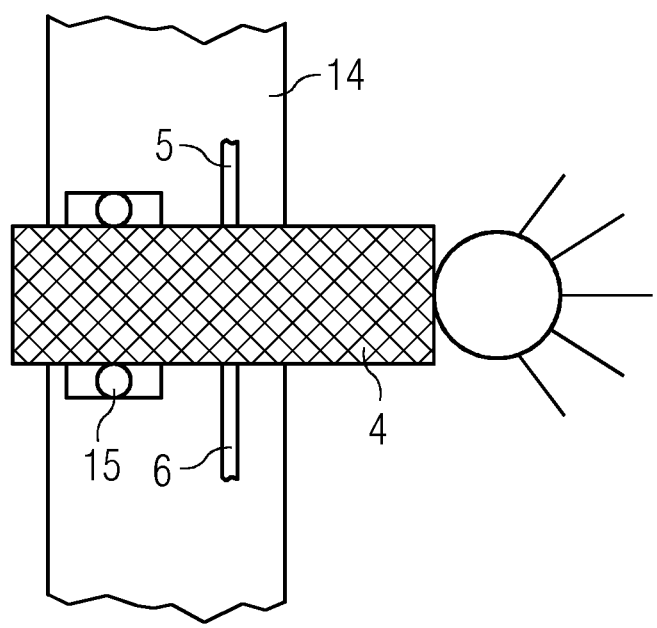
FIG. 3 shows a nozzle mixer unit which is fitted into a holder device by means of a quick-release lock.

As outlined in FIG. 3, each nozzle mixer unit 4 is fastened to a holder device 14 detachably by means of a bayonet lock 15. In the event of contamination a nozzle mixer unit 4 can be very easily exchanged manually.

Because the production of the oil in water emulsion does not take place in a centrally disposed mixer, but through the decentralized mixer units, each in geographical proximity to an assigned nozzle, the problem of saponification arises to a far lower degree. The inventive arrangement avoids long connecting lines and thus there are no long dwell times of the emulsion in lines, which could lead to a growth of the lines. The major advantage of the invention thus lies in a significantly reduced maintenance effort.

A further advantage is to be seen in the distributed arrangement of nozzle mixer units 4 being able to be cleaned more easily by hot water or water vapor than a nozzle arrangement of conventional construction with a central mixer.

The creation of the hot water in a continuous flow heater needs a lower installation volume on the roll stand compared to a hot water reservoir. Since the hot water is created in the water supply, a separate pipe line for cleaning purposes is not required. The cylinder lubrication system has fewer mechanical components.

Chemical cleaning agents and acids for removing saponification residue are not required. The maintenance personnel are not endangered by hazardous substances.

Although the invention has been illustrated and described in greater detail by the preferred exemplary embodiment, the invention is not restricted by the disclosed embodiments and other variations can be derived therefrom by the person skilled in the art, without departing from the scope of protection of the invention. It is thus conceivable that, instead of the single continuous flow water heater shown in FIG. 1, a number of continuous flow heaters with lower power can be used, which are each connected upstream of a nozzle mixer unit.

LIST OF REFERENCE CHARACTERS USED

1 Mixing and spray device
2 Cylinders
3 Rolling stock, rolled strip
4 Nozzle mixer unit
5 First supply line (water supply)
6 Second supply line (oil supply) filter
7 Mixing device
7' Premixing chamber
7" Main mixing chamber
8 Nozzle
9 Stop valve
10 Connecting line between 9 and 7'
11 Filter for water 12 Filter for oil
13 Filter for emulsion
14 Holder device
15 Bayonet lock
16 Control unit
17 Sensor device
18 Pressure sensor
19 Temperature sensor
20 Pressure sensor
21 Continuous flow heater
22 Water preparation system
23 Dosing pump
24 Water pump
25 Line bundle
26 Valve block of the line bundle
27 Rolling process computer

The invention claimed is:

1. A lubricating device for cylinders of a roll stand for roll-nip lubrication in a roll stand for a strip-shaped rolling stock, the lubricating device comprising a plurality of spray mixer units, each spray mixer unit comprising a mixing device configured for forming an emulsion of water and oil, a spray device communicating with the mixing device and configured and operable for spraying the emulsion onto at least one of the cylinders of the roll stand and/or onto the surface of the rolling stock, and a filter, for the emulsion of water and oil, which is located between the mixing device and the spray device; and each spray mixer unit being combined into a constructional unit, a first supply line being configured and connected to convey water to the spray mixer units and a second supply line being configured and connected to convey oil to the spray mixer units, wherein each constructional unit is spatially separated from the other constructional units.

2. The lubricating device as claimed in claim 1, wherein the water conveyed by the first supply line and the oil conveyed by the second supply line are conveyed by the first and second supply lines to the mixing device of each spray mixer unit, and the mixing device is configured to convey the mixture of water and oil formed therein immediately after the mixing in the mixing device to the spray device comprising a nozzle connected to the spray mixer unit which is configured to receive the mixture.

3. The lubricating device as claimed in claim 2, wherein each nozzle is associated with a respective mixing device.

4. The lubricating device as claimed in claim 2, further comprising a stop valve provided in each spray mixer unit, wherein the stop valve is configured to stop water from entering the second supply line and flow from the second supply line to the mixing device is routed via the stop valve.

5. The lubricating device as claimed in claim 1, wherein each of the individual spray mixer units is assigned a respective oil line from a bundle of oil lines leading from the second supply line.

6. The lubricating device as claimed in claim 5, wherein each of the spray mixer units is assigned at least one of a respective oil valve in a valve block of the line bundle, or a dosing pump or a pump element of a dosing pump, each configured for setting an oil volume flow separately for each of the spray mixer units.

7. The lubricating device as claimed in claim 1, wherein the plurality of spray mixer units are configured for use in a rolling mill for steel.

8. The lubricating device as claimed in claim 1, wherein the emulsion includes only water and oil.

9. The lubricating device as claimed in claim 1, wherein at least one heater is disposed in the first supply line, the heater being configured to heat the water in the first supply line to clean the spray devices.

10. The lubricating device as claimed in claim 1, wherein the number of spray devices is less than or equal to the number of mixing devices.

11. A lubricating device for cylinders of a roll stand for roll-nip lubrication in a roll stand for a strip-shaped rolling stock, the lubricating device comprising a plurality of spray mixer units, each spray mixer unit comprising a mixing device configured for forming an emulsion of water and oil, a spray device communicating with the mixing device and configured and operable for spraying the emulsion onto at least one of the cylinders of the roll stand and/or onto the surface of the rolling stock, and a filter, for the emulsion of water and oil, which is located between the mixing device and the spray device; and each spray mixer unit being combined into a constructional unit, a first supply line being configured and connected to convey water to the spray mixer units and a second supply line being configured and connected to convey oil to the spray mixer units, further comprising a filter for water and a filter for oil for each spray mixer unit.

12. A lubricating device for cylinders of a roll stand for roll-nip lubrication in a roll stand for a strip-shaped rolling stock, the lubricating device comprising a plurality of spray mixer units, each spray mixer unit comprising a mixing device configured for forming an emulsion of water and oil, a spray device communicating with the mixing device and configured and operable for spraying the emulsion onto at least one of the cylinders of the roll stand and/or onto the surface of the rolling stock, and a filter, for the emulsion of water and oil, which is located between the mixing device and the spray device; and each spray mixer unit being combined into a constructional unit, a first supply line being configured and connected to convey water to the spray mixer units and a second supply line being configured and connected to convey oil to the spray mixer units, further comprising a holder with a releasable connection, wherein one of the spray mixer units is held by the releasable connection in the holder.

13. The lubricating device as claimed in claim 12, wherein the releasable connection is a latching connection or a snap-in connection.

* * * * *